United States Patent
Li et al.

(10) Patent No.: US 8,626,212 B2
(45) Date of Patent: Jan. 7, 2014

(54) GROUP MESSAGING AT MOBILE TERMINAL IN AUTONOMOUS NETWORK

(75) Inventors: Li Li, Beijing (CN); Chi Liu, Beijing (CN); Liang Liu, Beijing (CN); Ju Wei Shi, Beijing (CN); Wen Jie Wang, Shanghai (CN); Wei Xue, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 13/599,687

(22) Filed: Aug. 30, 2012

(65) Prior Publication Data

US 2013/0084899 A1 Apr. 4, 2013

Related U.S. Application Data

(63) Continuation of application No. 13/596,418, filed on Aug. 28, 2012.

(30) Foreign Application Priority Data

Sep. 30, 2011 (CN) .......................... 2011 1 0305461

(51) Int. Cl.
  *H04W 4/00* (2009.01)
(52) U.S. Cl.
  USPC ............... 455/466; 455/414.1; 455/414.2; 455/413.3; 455/414.4; 455/422.1
(58) Field of Classification Search
  USPC .................. 455/466, 414.1–414.4, 422.1
  See application file for complete search history.

(56) References Cited

U.S. PATENT DOCUMENTS

| 6,185,208 B1 * | 2/2001 | Liao ............................. 370/392 |
| 6,738,618 B1 * | 5/2004 | Morales et al. .............. 455/419 |
| 2009/0111433 A1 * | 4/2009 | Muhonen et al. ......... 455/414.1 |

(Continued)

FOREIGN PATENT DOCUMENTS

| EP | 2166788 A1 | 3/2010 |
| EP | 2178036 A1 | 4/2010 |
| WO | 2011027023 A1 | 3/2011 |

OTHER PUBLICATIONS

Dave Cavalcanti, et al., "Self-Adaptive Routing Protocols for Integrating Cellular Networks, WLANs and MANETs," Journal—Wireless communictions and Mobile Computing; vol. 7, Issue 3, Mar. 2007; pp. 1-28.

(Continued)

*Primary Examiner* — Liton Miah
(74) *Attorney, Agent, or Firm* — Cantor Colburn LLP; Gail Zarick (57) ABSTRACT

A method for group messaging at a mobile terminal in autonomous network includes acquiring a message and a list of target identifiers, containing the identifiers of multiple mobile terminals to which the message is to be sent; transmitting the message via the autonomous network to any mobile terminal of the multiple mobile terminals that locates in the autonomous network, and removing the identifier of the mobile terminal from the list of target identifiers to obtain an updated list of target identifiers; generating an aggregate message, wherein the aggregate message contains the message and the identifiers in the updated list; sending the aggregate message to a base station if the length of the aggregate message does not exceed a threshold; dividing the aggregate message into multiple fragment messages and sending the multiple fragment messages to the base station if the length of the aggregate message exceeds the threshold.

6 Claims, 7 Drawing Sheets

(56) References Cited

U.S. PATENT DOCUMENTS

| | | | |
|---|---|---|---|
| 2009/0176518 A1* | 7/2009 | Doni | 455/466 |
| 2010/0285791 A1* | 11/2010 | Pirskanen et al. | 455/422.1 |
| 2010/0306320 A1 | 12/2010 | Leppanen et al. | |
| 2011/0055335 A1* | 3/2011 | Reilly et al. | 709/206 |
| 2011/0161427 A1 | 6/2011 | Fortin et al. | |
| 2012/0196579 A1* | 8/2012 | Souissi et al. | 455/414.4 |

OTHER PUBLICATIONS

Imrich Chlamtac, et al., "Mobile Ad Hoc Networking: Imperatives and Challenges," Elsevier, Ad Hoc Networks, 1; (2003); pp. 1-52.

Afra J. Mashhadi, et al.,"Habit: Leveraging Human Mobility and Social Network for Efficient Content Dissemination in MANETs," 2010; pp. 1-9.

Saad Ahmed Munir, et al., "Mobile Wireless Sensor Networks: Architects for Pervasive Computing," 2011; ISBN: 978-953-307-325-5 In book: Wireless Sensor Networks; pp. 1-26.

Juwel Rana, et al.,"Enriching and Simplifying Communication by Social Prioritization," International Conference on Advances in Social Networks Analysis and Mining, IEEE, 2010, pp. 1-5.

Juwel Rana, "Improving Group Communication by Harnessing Information from Social Networks and Communication Services," Licentiate Thesis; Lulea University of Technology, 2011; pp. 1-112.

* cited by examiner

GROUP MESSAGING AT MOBILE TERMINAL IN AUTONOMOUS NETWORK

PRIORITY

This application is a continuation of U.S. application Ser. No. 13/596,418, filed Aug. 28, 2012, which claims priority to Chinese Patent Application No. 201110305461.6, filed Sep. 30, 2011, and all the benefits accruing therefrom under 35 U.S.C. §119, the contents of which in their entirety are herein incorporated by reference.

BACKGROUND

The present disclosure relates generally to wireless communication, including short message service (SMS) and, in particular, to the reduction of communications traffic between mobile terminals and the base station in the course of applying SMS service.

Wireless frequency spectrum is an important resource for wireless communication services. With the development of broadband wireless communication, the demand for frequency spectrum tends to be in rapid and exponential growth. One of the embodiments is the popularity of small piece data services such as SMS and microblog. SMS is a tool that provides the user of mobile phone with short messages or other information. Microblog is a new means of communication. Microblog users may publish instant messages by distributing short posts over the network via mobile terminals such as mobile phones.

The data transportation capacity provided by the current wireless access network for data service is limited by wireless frequency spectrum resources. In reality, it often happens that transportation of a great deal of SMS messages of small piece data would burst in a short period of time. For example, at large gatherings, the huge communications traffic due to a great deal of SMS messages sent by group messaging would have a serious impact on a wireless access network, often leading to temporary unavailability of the SMS service.

SUMMARY

In one embodiment, a method for group messaging at a mobile terminal in an autonomous network includes acquiring a message and a list of target identifiers, the list of target identifiers containing the identifiers of multiple mobile terminals to which the message is to be sent; transmitting the message via the autonomous network to any mobile terminal of the multiple mobile terminals that is located in the autonomous network, and removing the identifier of the mobile terminal from the list of target identifiers to obtain an updated list of target identifiers; generating an aggregate message, wherein the aggregate message contains the message and the identifiers in the updated list of target identifiers; sending the aggregate message to a base station if the length of the aggregate message does not exceed a pre-defined threshold; and dividing the aggregate message into multiple fragment messages and then sending the multiple fragment messages to the base station if the length of the aggregate message exceeds the pre-defined threshold.

In another embodiment, a proxy apparatus for group messaging at a mobile terminal in the autonomous network includes an acquiring device, configured to acquire a message and the identifiers of multiple mobile terminals to which the message is to be sent; a transmitting device, configured to transmit a message via the autonomous network to one or more mobile terminals in the autonomous network; and a message aggregating device, configured to generate an aggregate message, the aggregate message containing a message and identifiers of multiple mobile terminals to which the message is to be sent, wherein the transmitting device is further configured to send the aggregate message generated by the message aggregating device to a base station of mobile terminals.

In still another embodiment, a method for message processing in a base station of wireless communication network includes receiving a message frame from a mobile terminal; if the payload of the received message frame is a fragment message, assembling the fragment message and other fragment messages belonging to the same series as the fragment message into an aggregate message; disassembling the aggregate message in the payload of the received message frame or obtained by assembling the fragment message to generate multiple standard downlink frames each containing a message and a target mobile terminal identifier, and sending the message to the mobile terminal corresponding to each target mobile terminal identifier.

BRIEF DESCRIPTION OF THE DRAWINGS

The features, advantages and other aspects of the various embodiments of the disclosure will become more apparent from the following detailed description taken in conjunction with the accompanying drawings. Hereon, by way of illustration, but non-limiting examples, the embodiments of the disclosure are illustrated. In the accompanying drawings.

DETAILED DESCRIPTION

The flowcharts and blocks in the figures illustrate the system, methods, as well as architecture, functions and operations executable by a computer program product according to embodiments of the present disclosure. In this regard, each block in the flowcharts or block may represent a module, a program segment, or a part of code, which contains one or more executable instructions for performing specified logic functions. It should be noted that, in some alternative implementations, the functions noted in the blocks may also occur in a sequence different from what is noted in the drawings. For example, two blocks shown consecutively may be performed in parallel substantially or in an inverse order. This depends on relevant functions. It should also be noted that each block in the block diagrams and/or flowcharts and a combination of blocks in the block diagrams and/or flowcharts may be implemented by a dedicated hardware-based system for performing specified functions or operations or by a combination of dedicated hardware and computer instructions.

Hereinafter, the principle and spirit of the present disclosure will be described with reference to various exemplary embodiments. It should be understood that provision of these embodiments is only to enable those skilled in the art to better understand and further implement the present disclosure, not intended for limiting the scope of the present disclosure in any manner.

In the following, various embodiments of the disclosure are described in detail with reference to accompanying drawings. For purpose of easy description and content consistency, in the following detailed description, the SMS will be taken as an example of short piece data service and the mobile phone will be taken as an example of smart mobile terminal/device. However, the disclosure is obviously not limited to that. Therefore, due to the need of the context in the specification, the term "mobile terminal" is sometimes used to represent "mobile phone", and vice versa.

Figure 1:
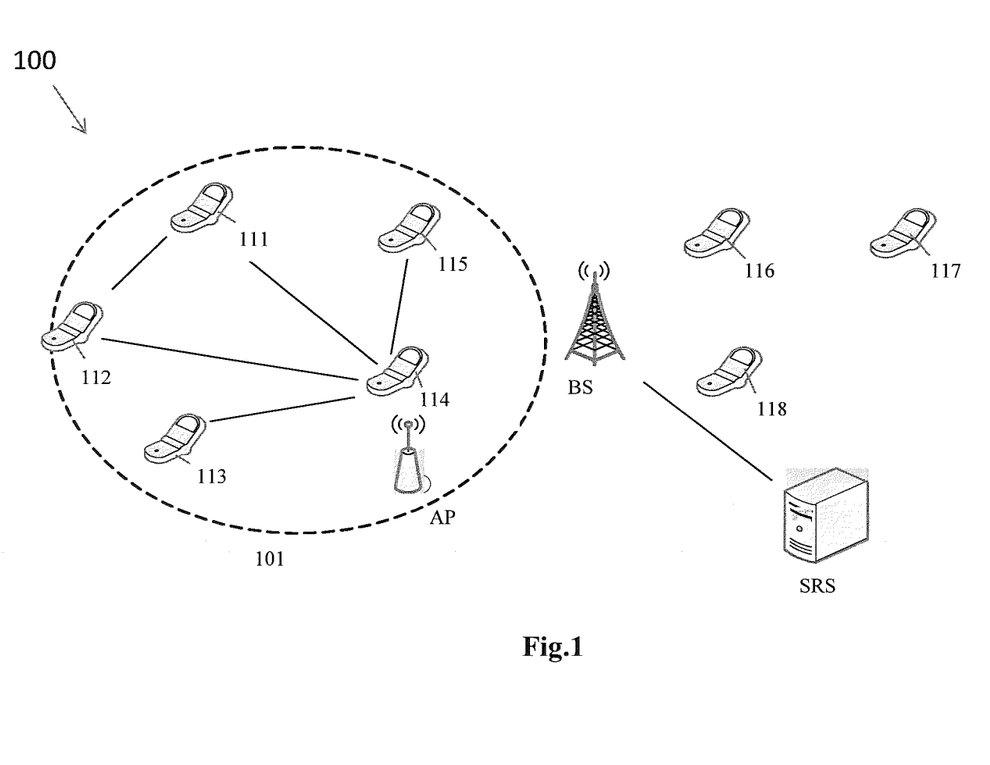
FIG. 1 shows a schematic diagram of a wireless communication network in which various embodiments of the disclosure may be applied.

FIG. 1 is a schematic diagram of a wireless communication network 100 in which various embodiments of the disclosure may be implemented. As shown in FIG. 1, there are several mobile terminals (such as mobile phones) 111-118, a base station BS and an autonomous network 101.

The mobile terminals 111-118 and the base station BS are a part of the wireless communication network 100. The mobile terminals and the base station communicate with an assigned wireless frequency band. When the mobile terminals transmit messages to each other via the base station, a source mobile terminal that originates a message would send an up-link frame (UL-frame) comprising a part of frame header and a part of frame content via the up link to the base station BS. The base station BS sends a down-link frame (DL-frame) via the down link to a target mobile terminal that received the message. Specific details such as coding, sending, receiving, decoding of the UL-frame and the DL-frame, are known in the art and thus a detailed description of the same is omitted here.

It is noted that although only eight mobile terminals are shown in FIG. 1, it should be understood that the base station BS may be able to manage additional mobile terminals than are illustrated in FIG. 1.

FIG. 1 also illustrates that a mobile terminal 114 is adjacent to a wireless access point (AP). The mobile terminal 114 having a WiFi function may establish a stable connection with external networks via the wireless access point.

FIG. 1 also shows that mobile terminals 111-115 are within coverage of the autonomous network 101. The autonomous network 101 is an independent wireless communication network providing end-to-end route of any pair of nodes within the network. The mobile terminals 111-115, as network nodes, are able to identify adjacent mobile terminals and effectively complete the grouping of multi-hop wireless network in self-organized manner. Examples of the implementation of the autonomous network include such techniques as PAN (Personal Area Network), IEEE 802.11G Standard, Bluetooth and so on.

The autonomous network 101 is a social relation based autonomous network (SAN). In such an autonomous network, mobile terminal users have some social relationships with each other, such as friends, colleagues, relations, club members and so on. Users may register with, for example, a social relationship server (SRS) providing social relationship registration service and establish various social relationships among themselves. The social relationship server SRS may also establish and save such social relationships automatically with such information as the communications record of the users, and provide query. In SAN, the short message route in the network layer is determined according to social relationships. WLAN or Bluetooth is taken as the Media Access Control Layer protocol for performing the transmission instruction issued by the Network Layer, so that end-to-end multi-hop transmission of SMS data may be realized. The mobile terminals in the autonomous network 101 may communicate with each other wirelessly via a connection channel provided by the autonomous network. For example, mobile terminals 111-115 may realize short message communication with each other by the "Bluetooth" function.

As shown in FIG. 1, at some point of time, there is a connection channel between the mobile terminal 111 and 112, as well as connection channels between the mobile terminal 114 and 111, 112, 113 and 115.

A SAN network list may be used to store identification information of the mobile terminals in the SAN, such as a mobile phone number. For example, assuming the phone numbers of the mobile terminals 111, 112, 113, 114 and 115 in the SAN of FIG. 1 are A1, A2, A3, A4 and A5 respectively, then the SAN network list may be {A1,A2,A3,A4,A5}.

Furthermore, the SAN network list may take the form of an adjacency list for representing connection relationships among mobile terminals, as the following:

A1:A2, A4
A2:A4
A3:A4
A4:A1, A2, A3, A4, A5
A5, A4

Wherein, for example, "A1: A2, A4" denotes that the mobile terminal 111 is adjacent to the mobile terminal 112 and 114 respectively, "A4: A1, A2, A3, A4, A5" denotes that the mobile terminal 114 is adjacent to the mobile terminal 111, 112, 113, 114 and 115 respectively.

Generally speaking, the mobile terminals in the autonomous network SAN 101 have different capabilities. The mobile terminals with relatively strong capability generally have following one or more capabilities, including: a relatively strong electric power endurance capability, such as having relatively adequate battery charge or having access to active power supply; a relatively strong processing capability, such as large storage, rapid in computing speed; having well established wireless connection with surrounding mobile terminals, and capable of realizing relatively stable wireless data transmission with surrounding mobile terminals; and a capability of establishing stable connection with wireless network external to the SAN.

As shown in FIG. 1, the mobile terminal 114 is a smart mobile device, such as notebook computer. The mobile terminal 114 is connected to an outer power supply and can establish stable connection with wireless communication network external to the SAN 101 via a wireless access point AP. It is the mobile terminal with stronger capability in the present SAN 101.

In practical implementations, other or more capability evaluation items may be set and a capability evaluation function Q may be used to quantify the capability of the mobile terminal.

The mobile terminal with stronger capability may become the relay device when other mobile terminals in the autonomous network are transmitting messages. There might be multiple mobile terminals qualified for acting as relay devices, one of which being the master relay device. The communication connections among the multiple relay devices have hierarchical relations like the tree structure, for example.

Figure 2:
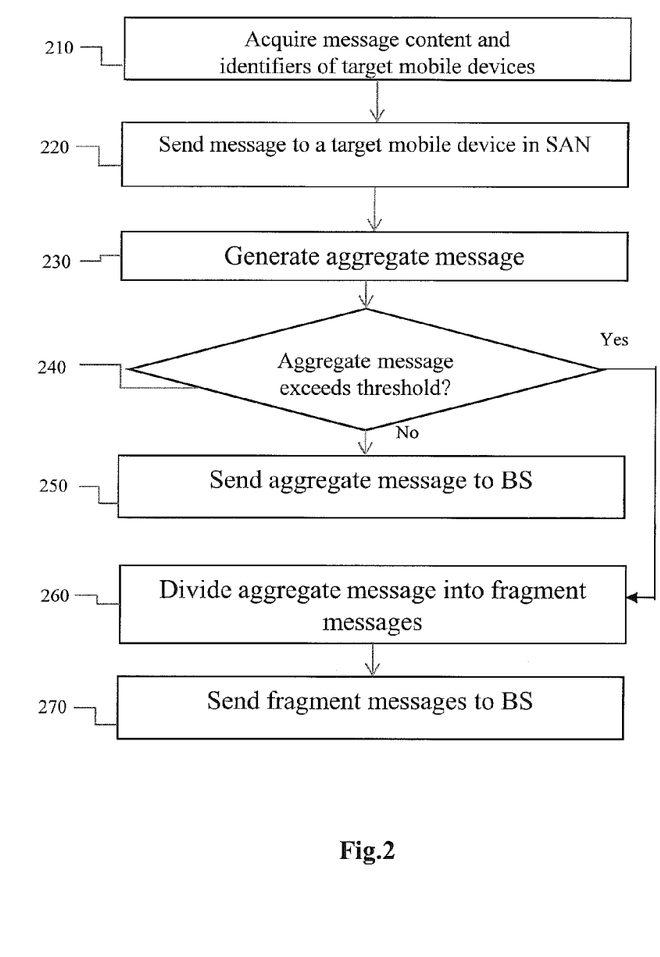
FIG. 2 shows a flow chart of a method in accordance with one embodiment of the disclosure.

In the following, a method of the disclosure for group messaging at a mobile terminal in the autonomous network will be described by way of example. FIG. 2 is a flow chart of the method in accordance with one embodiment of the disclosure.

As shown in the figure, in block 210, the mobile terminal 114 acquires a message MSG and the identifiers of multiple target mobile terminals to which the message is to be sent. In other words, the mobile terminal 114 acquires a message MSG and a list of target identifiers that contains the identifiers of multiple mobile terminals to which the message is to be sent.

According to one embodiment of the disclosure, the mobile terminal 114 acquires the message and the identifiers of multiple target mobile terminals based on a user's input. To facilitate description, the identifiers of target mobile terminals are also referred to as "target identifiers" below. Assuming the above list of target identifiers is <A3, A5, A6, A7, A8>, the target identifiers contained in the list are respectively the identifiers of the mobile terminal 113, 115, 116, 117 and 118. For example, "A3" denotes the mobile terminal 113. If the mobile terminal 113 is a mobile phone, then "A3" could be a phone number.

In block 220, the message is transmitted via the autonomous network to any mobile terminal of the multiple mobile terminals that is located in the autonomous network, and the identifier of the mobile terminal is removed from the list of target identifiers to obtain an updated list of target identifiers. In other words, for one or more mobile terminals corresponding to target identifiers that are located in the autonomous network 101, the message is transmitted via the autonomous network 101 to the one or more mobile terminals and the identifiers of the one or more mobile terminals are removed from the list of target identifiers.

For example, the mobile terminal 113 corresponding to "A3" is located in the autonomous network 101, so the mobile terminal 114 transmits the message MSG to the mobile terminal 113 via the autonomous network 101, and removes A3 from the list of target identifiers. Similarly, the mobile terminal 115 corresponding to "A5" is located in the autonomous network 101, so the mobile terminal 114 transmits the message MSG to the mobile terminal 115 via the autonomous network 101, and removes "A5" from the list of target identifiers. The message transmission from mobile terminal 114 to the mobile terminals 113 and 115 may be implemented by Bluetooth technology, for example.

According to one embodiment of the disclosure, block 220 may first detect whether mobile terminals corresponding to the acquired multiple target identifiers are located in the autonomous network 101.

According to one embodiment of the disclosure, the mobile terminal 114 may detect whether a mobile terminal is located in the autonomous network according to the SAN network list as described above.

If a certain mobile terminal is located in the autonomous network, then the message is transmitted to the mobile terminal via the autonomous network 101.

As a result of block 220, the content of target identifier list is updated to be <A6, A7, A8>.

In block 230, an aggregate message is generated, wherein the aggregate message contains the message and the updated list of target identifiers. In the present example, the aggregate message generated contains the message MSG and the target identifiers A6, A7 and A8.

According to an embodiment of the disclosure, the aggregate message also contains information indicating the position of the message MSG and the updated target identifier list <A6, A7 and A8> in the aggregate message.

Figure 3A:
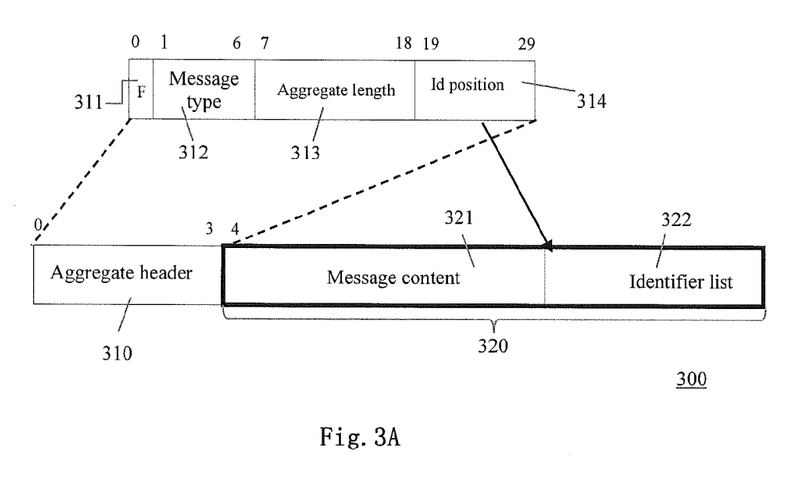
FIGS. 3A and 3B illustratively present the format of the aggregate message used in the method in accordance with one embodiment of the disclosure.

With reference to FIG. 3A, the format of an aggregate message is described below. FIG. 3A illustrates the format of aggregate message in accordance with an embodiment of the present disclosure. As shown in the figure, the aggregate message 300 includes an aggregate header 310 and an aggregate body 320, wherein the aggregate body includes a message content 321 and an identifier list 322.

As shown in the figure, the aggregate header 310 is 4 (four) characters in length, which comprises:

Bit 0: message indicator 311, indicating aggregate message if the value of the bit is 1, indicating fragment message if the value is 0;

Bits 1-6: message type 312, indicating a non-standard SMS frame if the value is "111111";

Bits 7-18: length of aggregate body 313, the value of which indicates the length of aggregate body 320 of aggregate message 300, the unit of the length being character; and Bits 19-29: identifier position 314, the value of which indicates the starting position of the target identifier list 322 in the aggregate message 300.

The message content 321 includes the content to be sent by group messaging, for example MSG.

The identifier list 322 comprises all the target identifiers in the target identifier list. Each target identifier in the identifier list 322 occupies a fixed length, or, target identifiers are separated by a specific separator between them.

With such a format, the starting position of the target identifier list 322 in the aggregate message may be determined according to the content of the identifier position 314. Then the position of each of target identifiers may be further determined according to the fixed length or the separator for the target identifier. The position of the message MSG can be determined according to the length of the aggregate header 310 and the target identifier position 314.

Figure 3B:
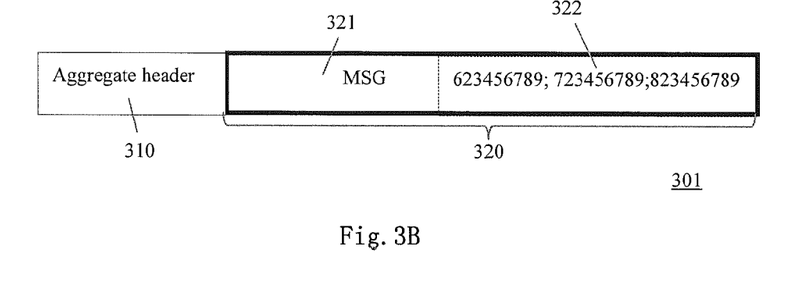

FIG. 3B is a schematic presentation of an aggregate message. As shown in the figure, an aggregate message 301 includes an aggregate header 310 and an aggregate body 320. The aggregate body further comprises a message MSG (321) to be sent by group messaging and identifiers (322) of target mobile terminals. Here, it is assumed that target mobile terminal 116, 117 and 118 are mobile phones and, for better description, the phone numbers "623456789", "723456789" and "823456789" are also used below to represent their respective identifiers A6, A7 and A8. The phone numbers are separated by the separator ";".

Those skilled in the art shall appreciate that, in practice, the length and content of the aggregate header 310 may be set according to requirements. Not only may the content and position of the message indicator 311, the message type 312, the payload length 313 and the identifier position 314 be adjusted, additional information may also be included into the aggregate header.

According to one embodiment of the disclosure, the aggregate header 310 may further contain the identifier of the source mobile terminal originating the group messaging of the message. Thus, the base station BS may determine that the message MSG is initially originated from the source mobile terminal represented by the identifier.

Referring again to FIG. 2, in decision block 240, it is determined whether the length of the aggregate message exceeds a pre-defined threshold. Here, the pre-defined threshold means a length threshold of the payload of message frame transmitted by the mobile terminal to the base station BS. A UL-frame, sent by the mobile terminal to the base station BS via the up-link, is the basic unit of transmission in wireless transmission channels and consists of a frame header and a payload with a certain length limitation. For example, the length threshold of the payload is 140 bytes or 70 characters for a UL-frame of SMS message channel. In general, the payload comprises the original data to be transmitted, and the frame header comprises the size, the target address or identifier, and the parity bit of the original data. If the aggregate message is taken as the payload of the UL-frame, the length of the aggregate message must not exceed the threshold of length of payload.

If the length of the aggregate message 300 does not exceed the pre-defined threshold, the aggregate message 300 is sent to a base station BS in block 250. Then, the process ends.

After the base station BS receives the UL-frame whose payload is the aggregate message 300, it will perform corresponding parsing. This further described below in conjunction with FIG. 5.

From the foregoing, it will be seen that if the length of the aggregate message does not exceed the pre-defined threshold, the aggregate message only needs to be transmitted from the mobile terminal 114 to the base station BS once, instead of three times, in order to sent the message to three target mobile terminals 116, 117 and 118. Thus the occupation of air interface bandwidth between the terminal and the base station could be reduced.

If the length of the aggregate message exceeds the pre-defined threshold, then the process proceeds to block 260, where the aggregate message is divided into multiple fragment messages.

For example, assuming that the pre-defined threshold is 70 characters, then the aggregate message 300 is divided into multiple fragment messages to so that the fragment messages, except the last one, are each 70 characters in length.

Figure 4A:
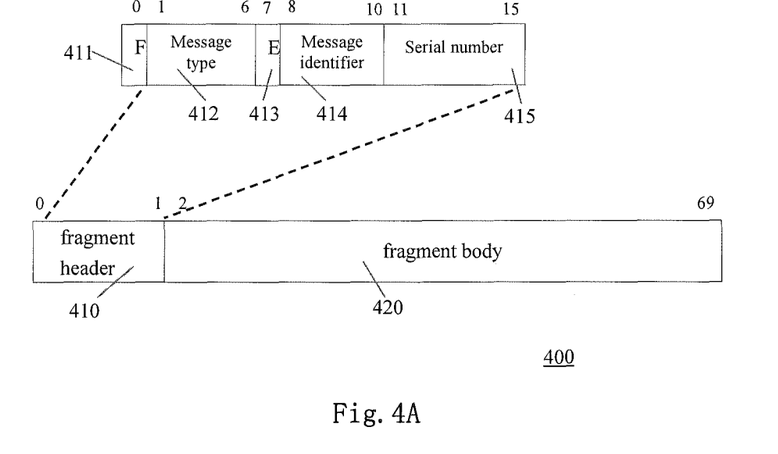
FIGS. 4A and 4B illustratively present the format of the fragment message used in the method in accordance with one embodiment of the disclosure.

With reference to FIG. 4A, the format of the fragment message is described below. FIG. 4A illustratively shows the format of a fragment message 400 in accordance with an embodiment of the disclosure. As shown in the figure, the fragment message 400 contains a fragment header 410 and a fragment body 420. They are respectively 2 characters (characters 0-1) and 68 characters (characters 2-69) in length.

As shown in the figure, the length of the fragment header 410 is 2 characters, which includes Message indicator 411 (bit 0), indicating fragment message if the value of the bit is 0 (zero), and message type indicator 412 (bits 1-6), used for distinguishing the fragment message of the disclosure from the standard SMS message. For example, a value of "111111" is used to indicate that the current frame is a fragment message.

End-of-fragment indicator 413 (bit 7) is used for indicating whether the fragment message is the last one of a series of fragment messages. For example, the value of End-of-fragment indicator may be set to "1" to indicate the fragment message is the last one.

Message identifier 414 (bits 8-10) is a field used for identifying different aggregate messages. For example, when the mobile terminal 114 sends a first aggregate message to the base station BS, the value of the field is "000" (binary). The value of the field will be increased by degrees along with the increase of the number of aggregate messages sent by the mobile terminal 114 to the base station BS. When the mobile terminal 114 sends the eighth aggregate message to the base station BS, the value of the field is "111".

Serial number 415 (bits 11-15) is a field used for identifying different fragment messages within the same aggregate message. The field is valid inside the same aggregate message. The initial value is "00000" (binary) corresponding to a first fragment message and the value will be increased by degrees as the number of fragment messages is increased, up to a maximum value of "11111". So the field can identify 32 fragment messages within the same aggregate message.

The fragment body 420 is filled with the data obtained by sequentially splitting the aggregate message 300 including the aggregate header 310.

Following the example shown in FIG. 3B, and assuming that the length of the aggregate message 300 is greater than 70 but not greater than 136, then the aggregate message 300 is divided into two fragment messages. The fragment body of the first fragment message contains the content of the first section starting from the starting position of the aggregate message 300, the length of the content of the first section being 68 characters. The payload of the second fragment message is the content after the first section content in the payload of the aggregate message 301. The length of the content is no more than 68 characters since the length of the aggregate message 300 is not greater than 136 characters.

Figure 4B:
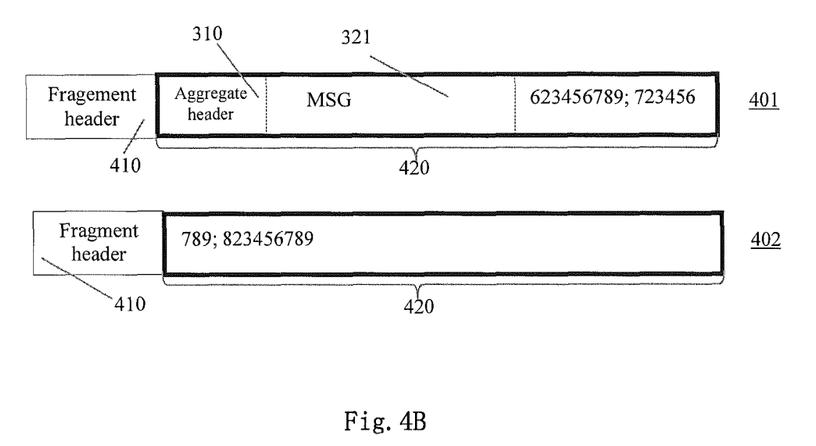

As shown in FIG. 4B, the series of fragment messages generated by dividing the aggregate message 301 include two fragment messages 401 and 402. The fragment body 420 of the first fragment message 401 contains the aggregate header 310 of the aggregate message 301 as well as the message content (321) and a part of the identifier list (322) in aggregate body 320. In the present example, the content of this part in the target identifier list is "623456789; 723456".

The fragment body 420 of the fragment message 402 contains the remaining part of target identifier list (322), i.e., "789; 823456789". Besides, the value of the End-of-fragment indicator 413 in the fragment header 410 of the fragment message 402 is set to 1, because the fragment message 402 is the last one in the generated series of fragment messages.

Returning to FIG. 2, in block 270 following block 260, the multiple fragment messages are sent to the base station BS. After the fragment messages are sent, the process ends. For example, in block 270, the fragment messages 401 and 402 are sent to the base station BS. The above description is an exemplary process of group messaging with the mobile terminal 114 acting as the originating mobile terminal.

Next, it is assumed that the user of a certain mobile terminal 111 intends to send a message with the content of MSG by group messaging to mobile terminals 113, 115, 116, 117 and 118. According to one embodiment of the disclosure, the mobile terminal 111 may first select a relay device from multiple mobile terminals in the social relation based autonomous network SAN 101. Generally speaking, the relay device that may be selected by the mobile terminal is a mobile terminal with relatively strong capability in the autonomous network SAN 101.

The below mechanism may be followed in determining a mobile terminal with relatively strong capability in the autonomous network SAN 101 to act as the relay device. When a mobile terminal starts, it will firstly launch broadcast information to search whether or not there is existed a SAN. If there is existed a SAN, the mobile terminal would launch a request for joining in the SAN to the mobile terminals in the SAN. The other mobile terminals in the SAN would learn the joining of the new mobile terminal and update respective adjacency lists. Otherwise, the mobile terminal would set up a SAN by itself, become a number of the SAN and automatically become the master relay device, with the value of capability assessment function Q being q.

The addresses or identifiers of other members in the SAN are acquired, and comparison is made between the value q' of its own capability assessment function Q to the value q of the capability assessment function Q of the current master relay device. If the difference q'−q is greater than a pre-defined threshold, the current master relay device will be replaced by the mobile terminal.

The mobile terminals in the SAN periodically report their own values of the capability assessment function Q to the master relay device. The master relay device maintains a list of nodes sorted according to values of Q of all mobile terminals within its scope coverage. And the node list is sent to the surrounding mobile terminals as a copy. At anytime, if there is a mobile terminal, the difference of whose value q' of capability assessment function Q of a mobile terminal and the value q of the capability assessment function Q of the current master relay device is greater than a pre-defined threshold, the mobile phone will replace the current master relay device.

When a mobile terminal normally exits from the SAN, it informs other surrounding mobile terminals to remove it from their route tables and informs the master relay device to remove it from the node list. The master relay device sends maintenance information to other mobile terminals periodically. If no reply is received from a certain mobile terminal upon a time-out, it indicates that the mobile terminal exits abnormally. Then the master relay device will broadcast to all mobile terminals in the SAN informing them to remove the exit mobile terminal from their route tables, and remove it from the node list.

If the master relay device normally exits from the SAN, it selects a mobile terminal with the highest Q value according to the node list, requests it to become the master relay device, and transfers management information to it. All mobile terminals in the SAN are notified of the updating of the master relay device. If the master relay device exits from SAN abnormally, other mobile terminal will not receive maintenance information from the master relay device upon a time-out. The relay device with a copy of the node list will select the mobile terminal with the highest Q value to be the master relay device according to the node list.

Assuming the relay device selected by the mobile terminal 111 is the mobile terminal 114, the mobile terminal 111 will transmit, via the SAN 101, the message MSG and the target identifier list <A3,A5,A6,A7,A8> to the mobile terminal 114 acting as the relay device.

Referring again to FIG. 2, in block 210, the mobile terminal 114 acquires a message and a target identifier list. Under the circumstance that the mobile terminal 114 is selected as the relay device by the mobile terminal 111, the mobile terminal 114 will receive the message MSG and the target identifier list <A3,A5,A6,A7,A8> transmitted from the mobile terminal 111 via the autonomous network 101.

The mobile terminal 114 may proceed with Block 220 to 270 so as to complete the processing of the message MSG and the target identifier list <A3,A5,A6,A7,A8>. The details are not repeatedly described herein.

According to one embodiment of the disclosure, in this case, in block 230 of generating aggregate message, the mobile terminal 114 also sets the identifier of the source mobile terminal 111 originating the group messaging in the aggregate header of the aggregate message.

According to one embodiment of the disclosure, prior to transmitting the message MSG and the target identifier list <A3,A5,A6,A7,A8> to the mobile terminal 114, the mobile terminal 111 may conduct aggregating processing of the message MSG and the target identifier list <A3,A5,A6,A7,A8> to generate an aggregate message. Then the aggregate message is transmitted to the mobile terminal 114. The mobile terminal 111 may conduct message aggregation with respect to the message MSG and the target identifier list <A3,A5,A6,A7, A8> in the same way as generating aggregate message shown in FIG. 2 (Block 230) and describe in the above. The details are not repeatedly described here.

In this case, what the mobile terminal 114 acquires from the mobile terminal 111 is the aggregate message containing the message MSG and the target identifier list <A3,A5,A6, A7,A8>.

According to one embodiment of the disclosure, the mobile terminal 114 that acquires the aggregate message containing the message MSG and the target identifier list <A3,A5,A6, A7,A8> from the mobile terminal 111 may obtain the message and each target identifier therein by parsing the aggregate message. Specifically, as described above in conjunction with FIGS. 3A and 3B, the aggregate header of the aggregate message contains information indicating the position of the message and the target identifiers in the aggregate message. According to the information, the message MSG and each target identifier may be extracted from the aggregate message. Then the mobile terminal 114 proceeds with blocks 220 to 270 so as to complete the processing of the message MSG and the target identifier list <A3,A5,A6,A7,A8>. The details are not repeatedly described herein.

In the above two embodiments, the source mobile terminal 114, as well as the source mobile terminal 111, sends message to five target mobile terminals by group messaging. But, the mobile terminal 114 only needs to send the message MSG to three mobile terminal 116,117 and 118 via the base station BS.

Furthermore, although the mobile terminal 114 needs to send message to the three mobile terminals via the base station BS, the mobile terminal 114 merely needs to transmit data to the base station BS twice. This shows that, by applying the embodiments of the disclosure, the times of signaling interaction and the up-link communications traffic between the mobile terminal and the base station may be reduced, thereby reducing the occupation of wireless bandwidth of the base station. In general, the more the numbers of identifiers for group messaging, the shorter the message MSG is.

The method for group messaging at a mobile terminal in the autonomous network is described above. Those skilled in the art shall appreciate the above method may be implemented by configuring a proxy at the mobile terminal.

Figure 6:
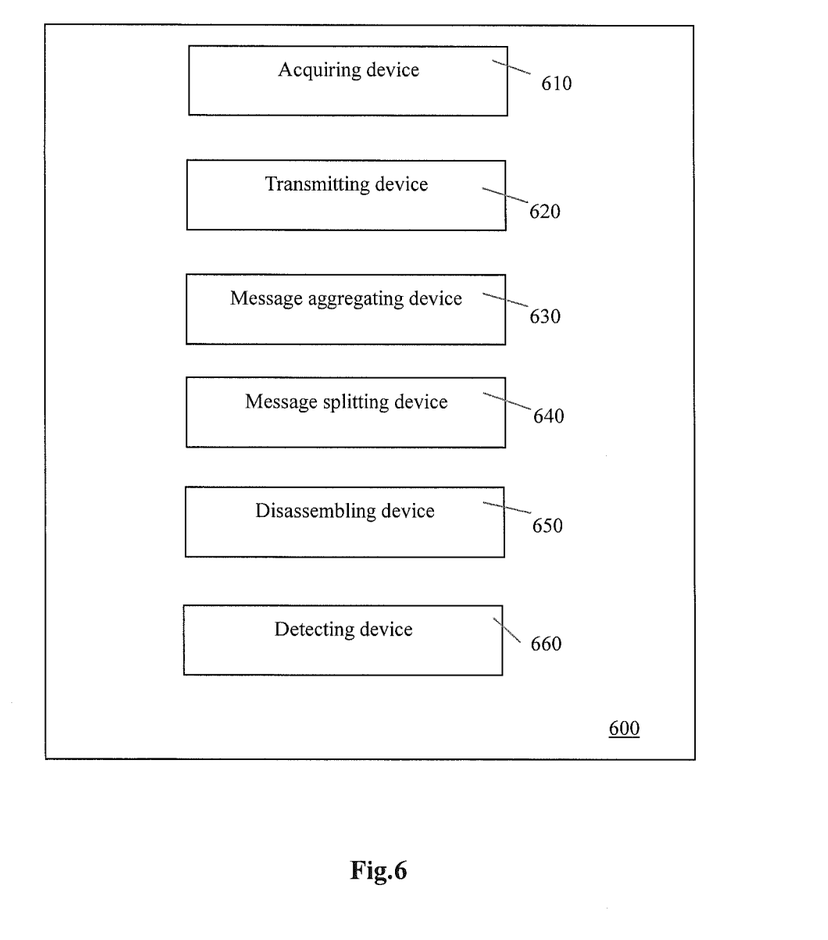
FIG. 6 is a block diagram of an apparatus in accordance with various embodiments of the disclosure.

According to the same inventive concept, the disclosure also provides a proxy apparatus for group messaging at a mobile terminal in the autonomous network. FIG. 6 illustratively shows the block diagram of an apparatus in accordance with various embodiments of the disclosure.

As shown in the figure, according to an embodiment of the disclosure, a proxy apparatus 600 for group messaging MSG at mobile terminal (111 . . . 117) in an autonomous network 101 comprises: an acquiring device 610 which is configured to acquire a message and the identifiers of multiple mobile terminals to which the message is to be sent; a transmitting device 620 which is configured to transmit a message via the autonomous network to one or more mobile terminals in the autonomous network; a message aggregating device 630 which is configured to generate an aggregate message 300, the aggregate message containing the message and the identifiers of multiple mobile terminals to which the message is to be sent, wherein the transmitting device 620 is further configured to send the aggregate message generated by the message aggregating device 630 to a base station BS of mobile terminals.

According to one embodiment of the disclosure, the transmitting device 620 is further configured to transmit the aggregate message 300 generated by message aggregating device 630 to one or more mobile terminals in the autonomous network 101.

According to one embodiment of the disclosure, the proxy apparatus 600 further comprises a message splitting device 640 which is configured to divide one aggregate message 300(301) into multiple fragment messages 400(401, 402), wherein the transmitting device 620 is further configured to send the fragment messages 400(401, 402) generated by the message splitting device 640 to a base station BS of mobile terminals.

According to one embodiment of the disclosure, the proxy apparatus 600 further comprises a disassembling device 650 which is configured to extract the message and each of the identifiers of multiple mobile terminals from the aggregate message containing the message and the identifiers of the multiple mobile terminals to which the message is to be sent.

According to one embodiment of the disclosure, the proxy apparatus 600 further comprises a detecting device which is configured to detect whether the mobile terminals corresponding to the identifier of multiple mobile terminal acquired by the acquiring device 610 are located in the autonomous network.

According to one embodiment of the disclosure, the detecting device 660 may detect whether a mobile terminal is located in the autonomous network according to the SAN network list described above.

The functions of various devices contained in the above proxy apparatus 600 and details of their implementation have been fully elaborated in previous description of various embodiments of the inventive method for group messaging at a mobile terminal in the autonomous network given in conjunction with drawings; thus they will not be repeatedly described here.

Various embodiments of the method and apparatus for group messaging at a mobile terminal in the autonomous network have been described in above. From the above description it can be known that the payload of a UL frame transmitted from the mobile terminal to the base station may comprises an aggregate message or a fragment message. Accordingly, the disclosure also provides a method for processing a message containing the aggregate message and the fragment message at the base station BS.

Generally speaking, the disclosure provides a method for message processing in a base station of wireless communication network, comprising: receiving a message frame from a mobile terminal; if the payload of the received message frame is a fragment message, then assembling the fragment message and other fragment messages belonging to the same series as the fragment message into an aggregate message; disassemble the aggregate message in the payload of the received message frame or obtained by assembling the fragment message to generate multiple standard downlink frames each containing a message and a target mobile terminal identifier, and sending the message to the mobile terminal corresponding to each target mobile terminal identifier.

Figure 5:
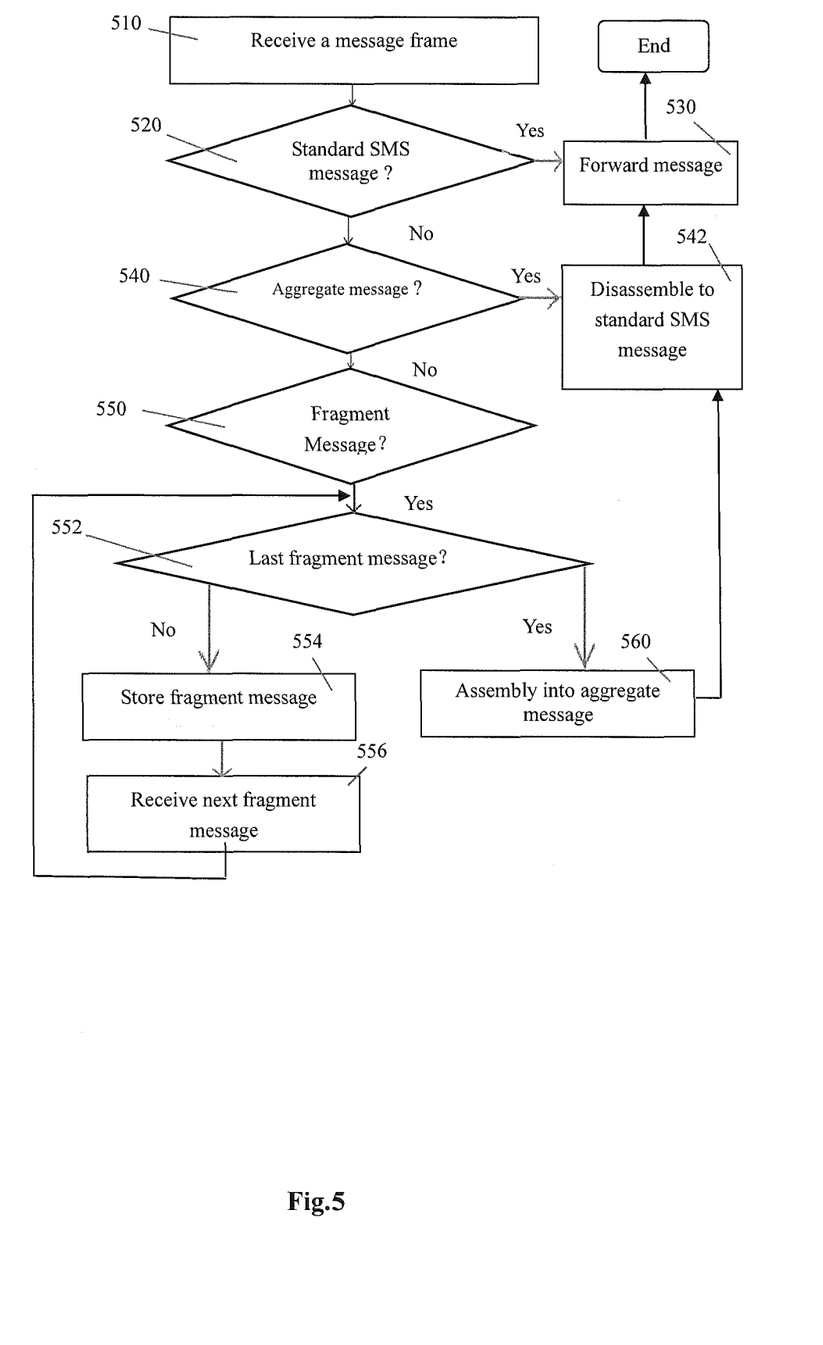
FIG. 5 is a schematic presentation of flow chart of the method for treatment of message at the base station in accordance with one embodiment of the present disclosure.

Referring to FIG. 5, there in shown a flow chart of a method for processing a message containing the aggregate message and the fragment message at the base station BS in accordance with an embodiment of the disclosure. In block 510, a message frame is received, which consists of a frame header and a payload. In decision block 520, it is determined whether or not the payload of received message frame is a standard SMS message.

As shown in FIGS. 3A and 4A, according to one embodiment of the disclosure, bits 1-6 (312, 412) of the aggregate message and the fragment message are taken as the "message type" indicator for distinguishing a standard UL frame from an aggregate message or a fragment message of the disclosure. For example, it may be prescribed that, for aggregate messages and fragment messages, the value of the bits is "111111". So, by reading the content of bits 1-6 in the payload of a message frame, it can be determined whether or not the payload is a standard SMS message.

If it is determined in decision block 520 that the payload is a standard SMS message, then, in block 530, the SMS message is forwarded in a standard manner. Then the processing of the frame ends. On the other hand, if it is determined in decision block 520 that the payload is not a standard SMS message, then, in decision block 540, it is determined whether the payload is an aggregate message. As described above in conjunction with FIG. 3A and FIG. 4A, the aggregate message and the fragment message may be distinguished by the setting a message indicator bit (311, 411). For example, the value of the message indicator bit of the aggregate message is "1" and the value of the message indicator bit of the fragment message is "0". Therefore, whether the payload is an aggregate message can be determined by reading the content of bit 0 in the payload of the received message frame.

If, in decision block 540, it is determined that the payload is an aggregate message is determined, the message frame is divided into one or more standard SMS message frames in block 542. Then the process turns to block 530, where the SMS message is forwarded in a standard manner. Then the processing of the frame ends.

As described above in conjunction with FIG. 3A and FIG. 3B, an aggregate message includes information for indicating the position of message and target identifier list in the aggregate message. Therefore, in block 542, each target identifier, i.e., the identifier of the mobile terminal to which the message is to be sent, such as mobile phone number, may be extracted from the aggregate message. Each target identifier is respectively combined with the message to obtain one or more standard SMS message frames.

If, in decision block 540, it is determined that the payload is not an aggregate message, then in decision block 550, it is determined whether the payload is fragment message. As described above, in the case that message indicator bits 311 and 411 are used for distinguishing aggregate message from fragment message, the determination operations in decision blocks 540 and 550 may be merged as one operation.

If, in decision block 550, it is determined that the payload is fragment message, the process turns to decision block 552. In decision block 552, it is determined whether the payload is the last fragment message in a series of fragment messages. As described in the above in conjunction with FIG. 4A, whether the payload is the last fragment message in a series of fragment messages may be determined according to the end-of-fragment indicator bit 413.

If it is determined that the payload is not the last fragment message, the process turns to block 554. In block 554, the received fragment message is stored. Then in block 556, the next fragment message is received. If the payload is the last fragment message is determined, then the process turns to block 560.

In Block 560, the fragment message and other fragment messages belonging to the same series as the fragment messages are assembled into an aggregate message. The other fragment messages belonging to the same series as the fragment message are those that are in block 554. As descried above in conjunction with FIG. 4A, the "message identifier" field 414 in a fragment message contains the identifier of the aggregate message and the "serial number" field 415 contains the serial number of the fragment message. Therefore, block 560 may proceed in the following manner: extracting the payload of each fragment message having the same content of the "message identifier" field 414, and then combining each of the extracted payloads sequentially in the order of the serial number in the "serial number" field 415 to obtain a completed aggregate message.

For example, the method of assembling the fragment message 401 and 402 shown in FIG. 4B is to combine the splitting body 420 in the fragment message 401 and the fragment body 420 in the fragment message 402 in sequence. Since the fragment body 420 of the first fragment message 401 contains the aggregate header 310 of aggregate message 301, the sequential combination results in a completed aggregate message 301 as shown in FIG. 3B.

After block 560, the process proceeds to blocks 542 and 530. Then the process ends. As a result, the base station BS sends the message MSG to mobile terminals 116, 117 and 118 via downlink.

Various embodiments of the disclosure have been described in the above. It should be noted that the above depiction is only exemplary, not intended for limiting the present disclosure. In other embodiments of the present disclosure, the method may have more, or less, or different blocks, and numbering the blocks is only for making the depiction more concise and much clearer, but not for stringently limiting the sequence between each blocks, and the sequence of blocks may be different from the depiction.

Therefore, in some embodiments, the above one or more optional blocks may be omitted. Specific embodiment of each block may be different from the depiction. All these variations fall within the spirit and scope of the present disclosure.

The present disclosure may adopt a form of hardware embodiment, software embodiment or an embodiment comprising hardware components and software components. In a preferred embodiment, the present disclosure is implemented as software, including, without limitation to, firmware, resident software, micro-code, etc.

Moreover, the present disclosure may be implemented as a computer program product usable from computers or accessible by computer-readable media that provide program code for use by or in connection with a computer or any instruction executing system. For the purpose of description, a computer-usable or computer-readable medium may be any tangible means that can contain, store, communicate, propagate, or transport the program for use by or in connection with an instruction execution system, apparatus, or device.

The medium may be an electric, magnetic, optical, electromagnetic, infrared, or semiconductor system (apparatus or device), or propagation medium. Examples of the computer-readable medium would include the following: a semiconductor or solid storage device, a magnetic tape, a portable computer diskette, a random access memory (RAM), a read-only memory (ROM), a hard disk, and an optical disk. Examples of the current optical disk include a compact disk read-only memory (CD-ROM), compact disk-read/write (CR-ROM), and DVD.

Figure 7:
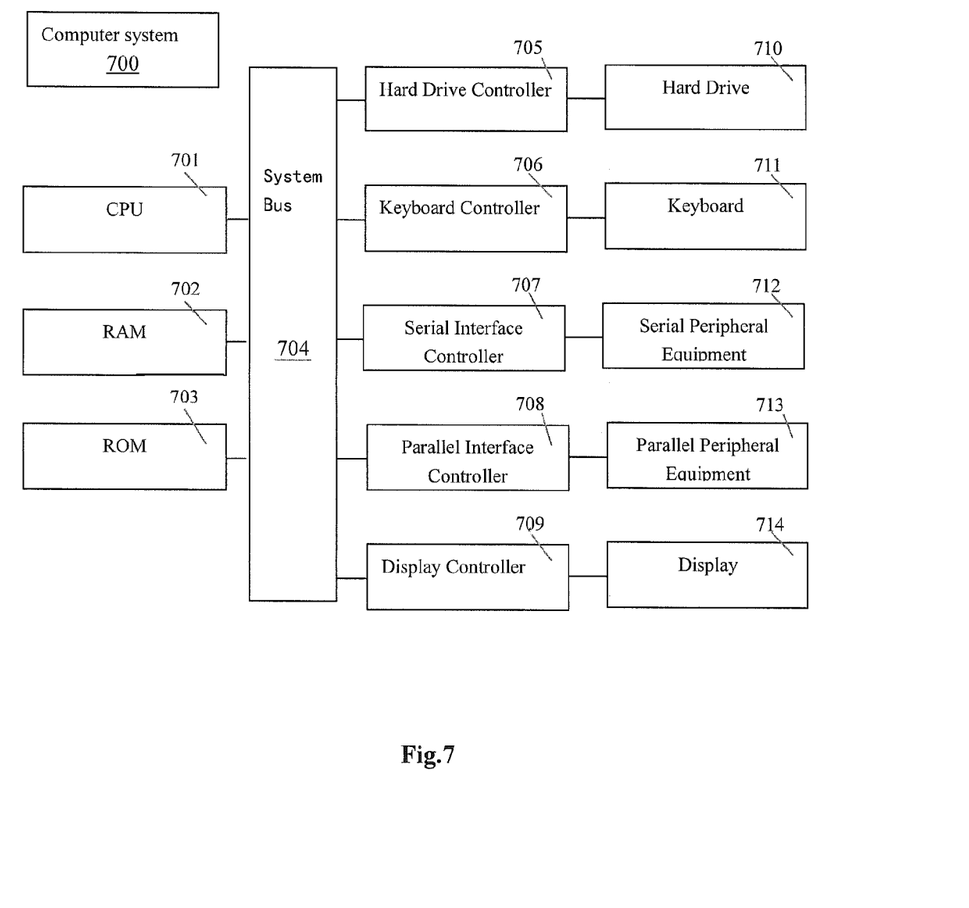
FIG. 7 shows an exemplary computer system which is applicable to implement the embodiments of the disclosure.

FIG. 7 shows an exemplary computer system 700 which is applicable to implement the embodiments of the present disclosure. As shown in FIG. 7, the computer system 700 may include: CPU (Central Process Unit) 701, RAM (Random Access Memory) 702, ROM (Read Only Memory) 703, System Bus 704, Hard Drive Controller 705, Keyboard Controller 706, Serial Interface Controller 707, Parallel Interface Controller 108, Display Controller 109, Hard Drive 710, Keyboard 711, Serial Peripheral Equipment 712, Parallel Peripheral Equipment 713 and Display 714. Among above devices, CPU 701, RAM 702, ROM 703, Hard Drive Controller 705, Keyboard Controller 706, Serial Interface Controller 707, Parallel Interface Controller 708 and Display Controller 709 are coupled to the System Bus 704. Hard Drive 710 is coupled to Hard Drive Controller 705. Keyboard 711 is coupled to Keyboard Controller 706. Serial Peripheral Equipment 712 is coupled to Serial Interface Controller 707. Parallel Peripheral Equipment 713 is coupled to Parallel Interface Controller 708. And, Display 714 is coupled to Display Controller 709. It should be understood that the structure as shown in FIG. 7 is only for the exemplary purpose rather than any limitation to the present disclosure. In some cases, some devices may be added to or removed from the computer system 100 based on specific situations.

A data processing system adapted for storing or executing program code would include at least one processor that is coupled to a memory element directly or via a system bus. The memory element may include a local memory usable during actually executing the program code, a mass memory, and a cache that provides temporary storage for at least one portion of program code so as to decrease the number of times for retrieving code from the mass memory during execution.

An Input/Output or I/O device (including, without limitation to, a keyboard, a display, a pointing device, etc.) may be coupled to the system directly or via an intermediate I/O controller.

A network adapter may also be coupled to the system such that the data processing system can be coupled to other data processing systems, remote printers or storage devices via an intermediate private or public network. A modem, a cable modem, and an Ethernet card are merely examples of a currently usable network adapter.

In view of the above-mentioned problems, one embodiment of the disclosure is to reduce communications traffic and the number of signaling interactions between the mobile terminal and the base station for the service of group messaging of small piece data by mobile terminals (such as SMS group messaging) in wireless access network.

By applying various embodiments of the disclosure, on one hand, by using social relation based autonomous network to transmit messages to a part of mobile terminals as target of group messaging, redundant traffic between the mobile terminal and the base station could be eliminated, thereby reduce the required communications traffic through the base station; on the other hand, by optimized treatment of the messages to be transmitted via the base station (such as by message aggregating, fragmenting, assembling and disassembling), the communications traffic transmitted through the base station could also be reduced.

It is to be understood from the foregoing description that modifications and alterations may be made to the respective embodiments of the present disclosure without departing from the true spirit of the present disclosure. The description in the present specification is intended to be illustrative and not limiting. The scope of the present disclosure is limited by the appended claims only.

The invention claimed is:

1. A method for group messaging at a mobile terminal in an autonomous network, comprising:
acquiring a message and a list of target identifiers, the list of target identifiers containing the identifiers of multiple mobile terminals to which the message is to be sent;
identifying a first subset of the mobile terminals as being located in the autonomous network;
identifying a second subset of the mobile terminals as being located outside the autonomous network;
transmitting the message via the autonomous network to the first subset of the mobile terminals, and removing the identifiers of the first subset of the mobile terminals from the list of target identifiers to obtain an updated list of target identifiers, wherein the updated list of target identifiers comprises the target identifiers of the second subset of the mobile terminals located outside the autonomous network;

generating a first aggregate message, wherein the first aggregate message contains the message and the identifiers of the second subset of the mobile terminals;

sending the first aggregate message to a base station if the length of the first aggregate message does not exceed a pre-defined threshold; and dividing the first aggregate message into multiple fragment messages and then sending the multiple fragment messages to the base station if the length of the first aggregate message exceeds the pre-defined threshold.

2. The method of claim 1, wherein said acquiring the message and a list of target identifiers comprises receiving the message and the list of target identifiers from one or more other mobile terminals via the autonomous network.

3. The method of claim 2, wherein the message and the list of target identifiers from the other mobile terminals are contained in a second aggregate message generated by aggregation processing of the message and the list of target identifiers at the other mobile terminal.

4. The method of claim 3, further comprising: parsing the second aggregate message generated by aggregation processing of the message and the list of target identifiers at the other mobile terminals to extract the message and each identifier in the list of target identifiers.

5. The method of claim 1, wherein the identifier of a source mobile terminal originating the message is set in the second aggregate message.

6. The method of claim 1, wherein said identifying the first subset of the mobile terminals as being located in the autonomous network comprises detecting that the first subset of the mobile terminals are located in the autonomous network defined by a social relation based autonomous network list, wherein the social relation based autonomous network list comprises a list of mobile terminals associated with a plurality of users who share a social relationship with one another.

* * * * *